United States Patent

[11] 3,541,947

[72] Inventor Albert P. Anderson
         Des Plaines, Illinois
[21] Appl. No. 741,684
[22] Filed July 1, 1968
[45] Patented Nov. 24, 1970
[73] Assignee Perfect Automatic Egg Timer & Mfg. Co.
         Elk Grove Village, Illinois
         a corporation of Illinois

[54] COOKING UTENSIL
     11 Claims, 7 Drawing Figs.
[52] U.S. Cl.................................................. 99/332,
         99/337, 99/342, 99/440, 99/448; 219/401
[51] Int. Cl...................................... A47j 27/62
[50] Field of Search.............................. 219/401;
         99/325, 330, 336, 337, 338, 327, 403, 234A,
         234T, 440, 448, 342, 332

[56]              References Cited
              UNITED STATES PATENTS
1,716,002  6/1929  Parker........................  99/336
1,865,973  7/1932  Shields.......................  99/440X
2,018,698  10/1935 Allen..........................  99/327
2,057,741  10/1936 Purpura.....................  219/401X
2,274,325  2/1942  Ford...........................  99/332
2,766,366  10/1956 Eckhoff.......................  99/325
3,154,004  10/1964 Huck...........................  99/337X
              FOREIGN PATENTS
303,301    1/1929  Great Britain..............  99/332
965,462    7/1964  Great Britain.

Primary Examiner—Billy J. Wilhite
Attorney—Hofgren, Wegner, Allen, Stellman & McCord ABSTRACT: The invention relates to utensils for cooking comestibles for a predetermined period of time. An insulated container is provided with one or more cooking chambers each separately closed by a pivoted cover. In operation, controlled heat is continuously supplied to water in the chambers with means being provided for shutting the heat off if insufficient water is available in the chambers. Interconnections are provided between each cover and a timing mechanism for that chamber such that after a predetermined time is set on the timer, the timer will commence operation only when the cover is closed. Expiration of the time on the timer will release the latched cover which will open and substantially stop the cooking in the chamber. The cooking takes place in the closed chamber by the action of the steam given off from the water in the chamber.

Patented Nov. 24, 1970

Inventor:
Albert P. Anderson
By: Hofgren, Wegner, Allen,
Stellman & McCord
Attorneys

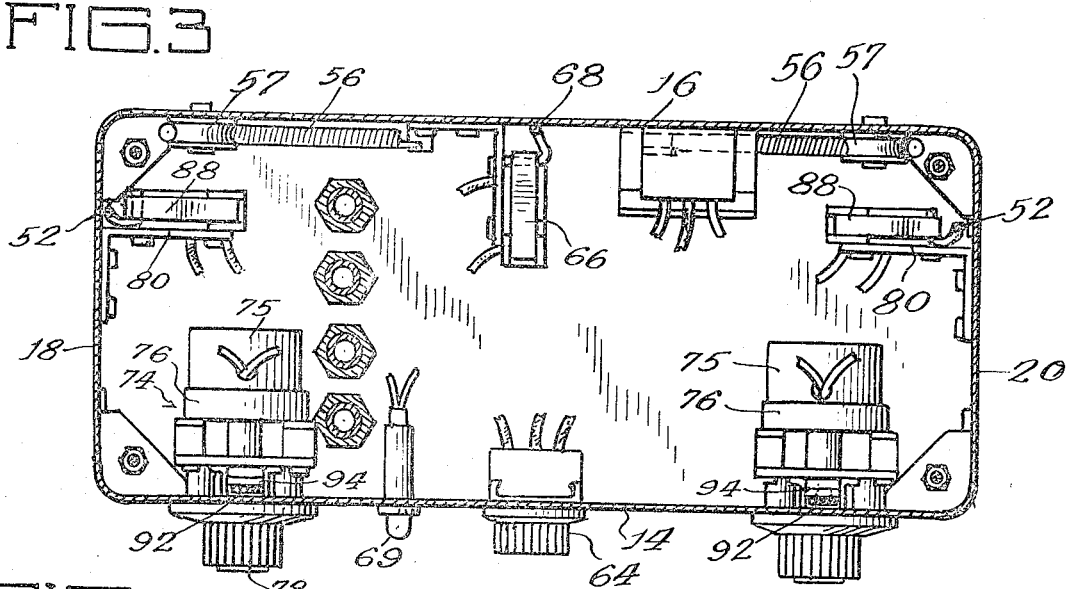
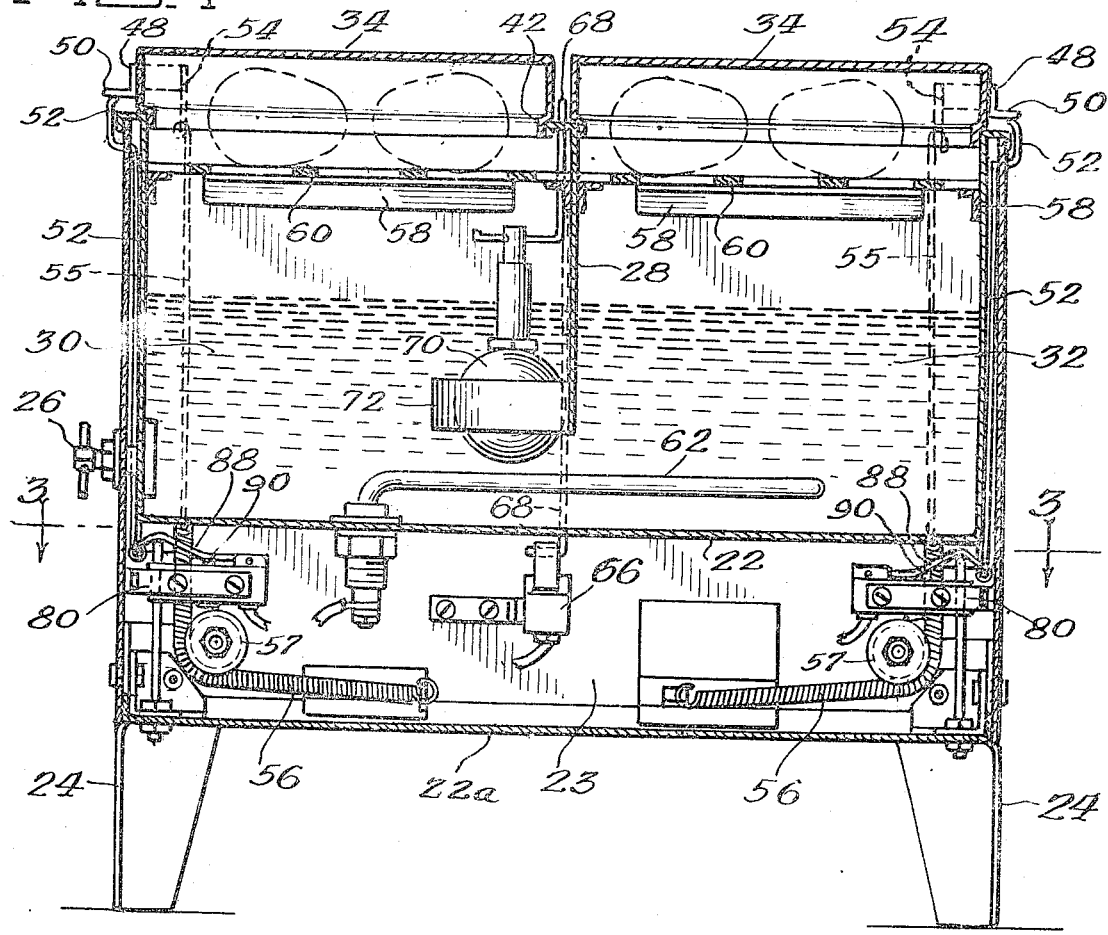

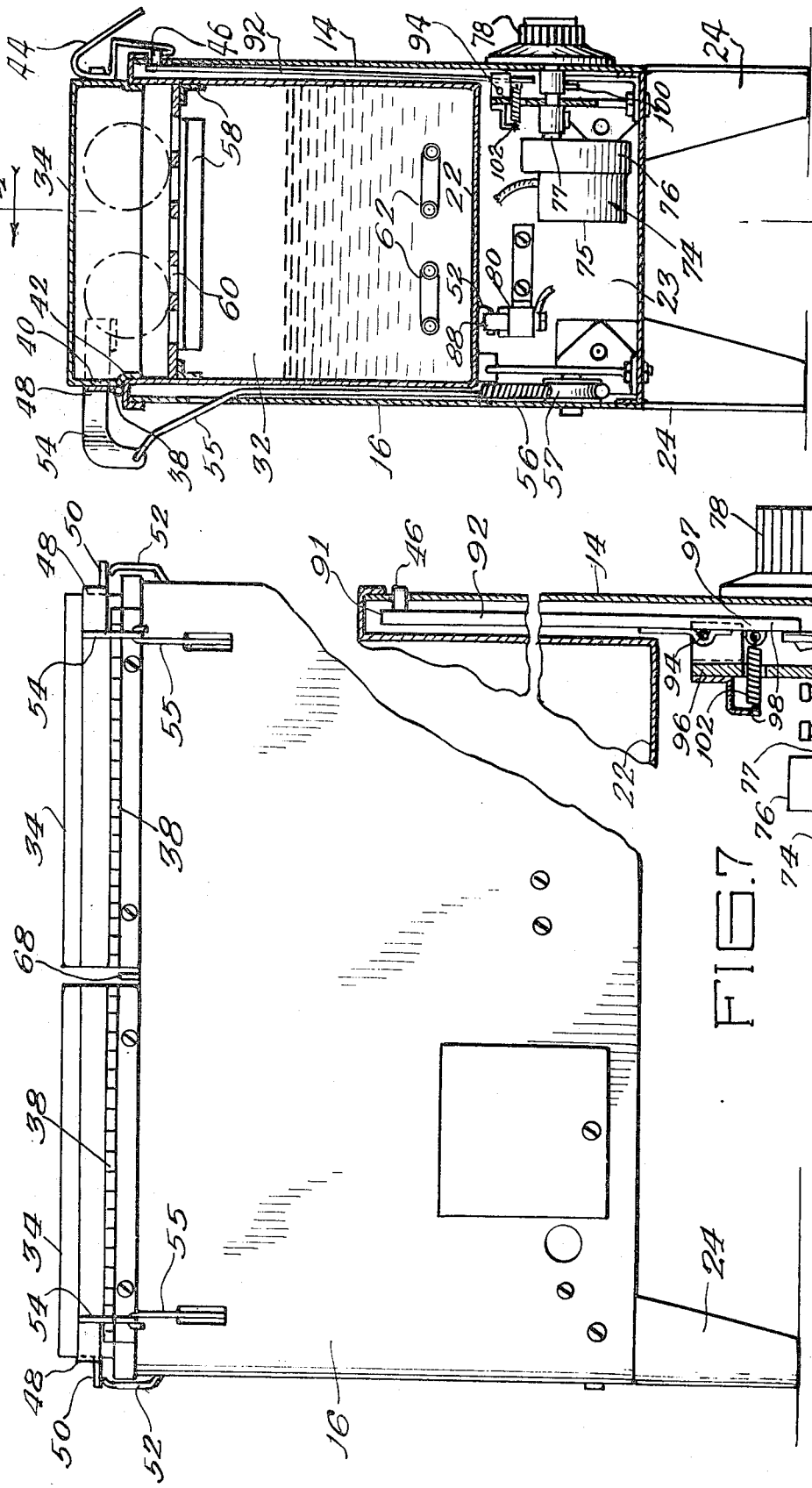

COOKING UTENSIL

BACKGROUND OF THE INVENTION

1. Field of the Invention

The invention relates to timer controlled cooking of comestibles in a moist atmosphere.

2. Description of the Prior Art

For many years, various utensils have been provided for cooking comestibles a predetermined period of time. Examples of such equipment are the egg timers shown in U.S. Pat. Nos. 2,477,805; 2,572,934 and 2,568,049. All of these devices provide for submerging the eggs in boiling water for a predetermined period of time after which the eggs are removed from the water for serving. Another U.S. Pat. No. 2,618,219 shows a cooking utensil with a cover and within which utensil hot water is cascaded over the comestible, such as an egg, to cook it (i.e., poaching) for a predetermined time cycle.

The prior devices provided for cooking a comestible by submerging it in water in an open container or flooding it with water in a closed container whereby after a predetermined period of time the cooking is substantially stopped by removing the comestible from the cooking water.

SUMMARY OF THE INVENTION

It has been found that many items will cook effectively in a moist atmosphere in the same amount of time as when submerged in boiling water. This phenomenon has been found to be particularly true with items such as eggs with or without shells, and prepackaged foods, such as peas, corn and corned beef, and the like. The apparatus hereinafter disclosed makes use of the moist atmosphere cooking of foods in a chamber with a timer controlled closure therefor which automatically substantially stops the cooking upon the expiration of a preset time interval.

I have illustrated and described one preferred embodiment of my invention, but this description is only by way of example and not by way of limitation. It is understood that the invention is susceptible of numerous modifications, and it is not to be regarded as more limited in scope than is indicated by the appended claims.

BRIEF DESCRIPTION OF THE DRAWINGS

FIG. 3 is a cross-sectional view taken on the line 3—3 of FIG. 4;

FIG. 4 is a cross-sectional view taken on the line 4—4 of FIG. 6;

FIG. 5 is a rear elevational view of the utensil with one corner broken away;

FIG. 6 is a cross-sectional view taken on the line 6—6 of FIG. 1; and

FIG. 7 is an enlarged, broken away, partial sectional view of the details of timer actuated latching means.

Figure 1:
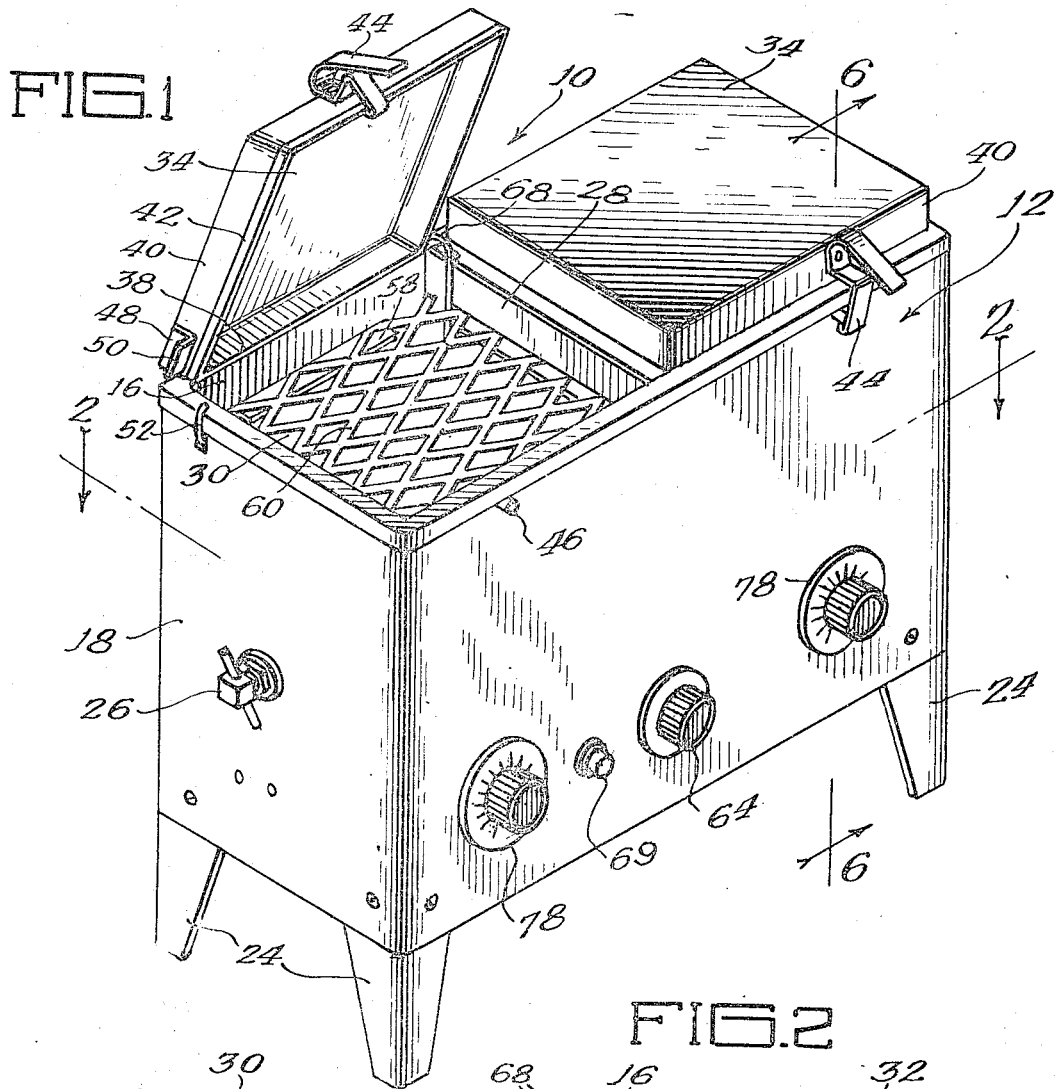
FIG. 1 is a perspective view of a cooking utensil in accordance with the present invention, showing two separate cooking chambers.

The cooking utensil is identified as a whole by the numeral 10 and is of a design which is readily fabricated of aluminum, stainless steel or other appropriate sheet or plate material. The utensil 10 has a container or housing 12 with a front wall 14, rear wall 16, side walls 18 and 20 and a bottom wall 22. The walls are formed of spaced apart sheets of material with air insulation inbetween. In the case of the plates forming the bottom wall, 22, 22a, they are spaced apart considerably to provide an area 23 for housing the controls for the utensil. Appropriate legs 24 are provided, if desired, to space the container from the supporting surface. A drain cock 26 is provided through one side wall 18 for draining the water from the container or housing 12. A partition 28 is provided to divide the illustrated container into two separate cooking chambers 30 and 32 although it is to be understood that the invention contemplates one chamber or any number of chambers as desired. The partition 28 extends only to a particular level in the container 12 which will be below the operating water level in the container as will be explained more fully hereinafter.

Each chamber 30, 32 has a cover 34 pivoted to the container 12 by a hinge 38. The cover 34 has an inverted cup shape with downward depending sidewalls 40 offset slightly inward at 42 near the lip thereof so as to extend into the open top of the chamber 30, 32 in somewhat sealing relationship therewith. The cover 34 has a catch member 44 which is adapted to coact with a latch member 46 projecting from the front wall of the container 12, the operation of the latch and catch will be described hereinafter. A hinge bracket 48 is secured to the cover 34 and has one horizontal portion 50 on the side of the cover which operatively engages with a rod 52 projecting from the side of the container when the cover is closed. The hinge bracket 48 has a rearwardly extending portion 54 which is operatively connected to a rod 55 also extending from within the walls of the container. The rod 55, as best shown in FIGS. 3, 4 and 6, is connected to one end of a spring 56 which engages in a groove in a roller 57 pivotally mounted in the area 23 between the bottom plates 22. The other end of the spring 56 is anchored to the rear wall of the container with sufficient tension in the spring to pull the rod 55 downward on the bracket 48 to pivot the cover 34 about the hinge 38 into open position. The cover 34 is, therefore, spring loaded into the open position.

Brackets 58 are provided inside the walls of the container in each chamber upon which grate type retaining shelves 60 are removably supported.

Figure 2:
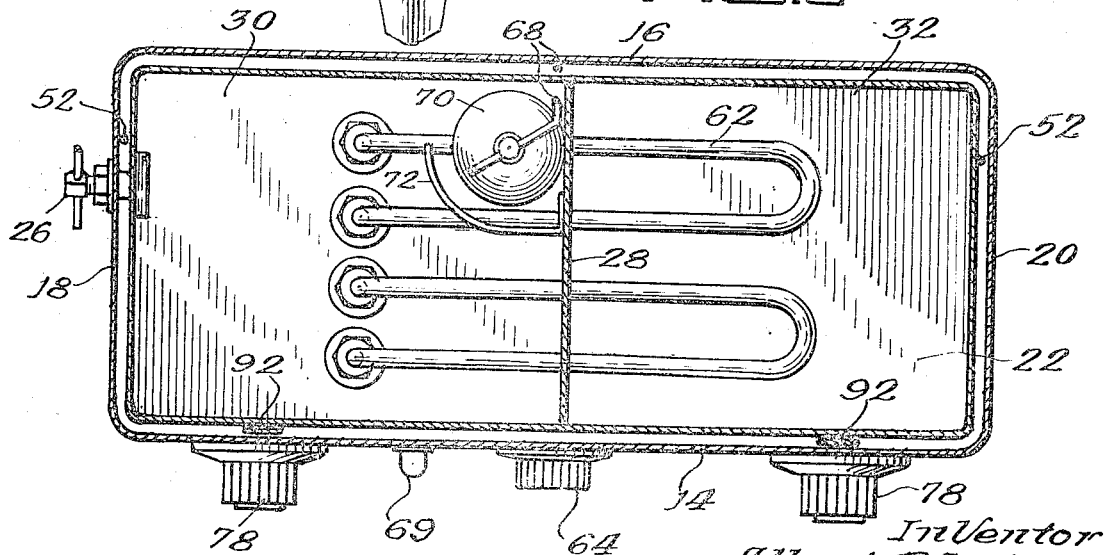
FIG. 2 is a cross-sectional view taken on the line 2—2 of FIG. 1.

Heating coils 62 of an appropriate type, i.e., those sold under the trademark CALROD, are bolted into the container 12 so as to lie along the bottom wall 22 in the container and extend into the water in each chamber 30 and 32 as shown in FIG. 2. The heating coils 62 are electrically connected to a source of power through a control switch 64 and on through an override microswitch 66. An indicator light 69 is mounted on the front wall 14 and is wired in the heating coil circuit in such a way that it will glow red when the current is on and the rods are heating.

The switch 64 is a conventional variable control switch which can have plural heat settings. In the illustrated switch 64 there are four positions, off, low, medium and high. The low setting is a holding setting to keep the water at a ready condition. The medium setting is for normal and regular use, wherein the high setting is for peak use periods. The override microswitch 66 is operated by a rod 68 which extends from the switch between the plates of the back wall and into a position in the container where it is operatively connected to a float control member 70. When the water level in the container drops below a predetermined point, the float 70 will actuate the switch 66 by means of the rod 68 to shut off the current to the heating coils 62. The indicator light 69 will go off and the operator will know he is to add water to the container. The heat coils cannot be turned on until at least a minimum amount of water is in the container. A shield 72 carried by partition 28 is provided around the float member 70 to act as a guide up and down in the container. The rod 68 traverses a path from between the back walls, between the covers 34 and into the container without contacting or interfering with the covers 34 or their operation.

A timing mechanism 74 is provided for each cooking chamber 30, 32 to control starting and stopping of moist atmosphere cooking in said chamber by controlling the opening of the cover to said chamber. Specifically, a timing motor 75 and appropriate gearing 76 are mounted in the area 23 with the output shaft 77 of the gearing being connected to the dial or knob 78 on the front of the container 12. The current for the timing motor 76 passes through an override microswitch 80 which is operatively connected to a rod 52 extending between the plates of the side wall 18. The end of the rod 52 projects into the path of the portion 50 of the bracket 48 on the cover 34 such that when the cover 34 is closed the rod 52 is pushed downward to close the microswitch 80 to permit current to flow to the timing mechanism 74. The rod 52 is pivoted to a blade 88 on the microswitch such that when the rod 52 is depressed the blade 88 depresses the pin 90 for closing the microswitch 80.

As best shown in FIG. 7, the latch member 46 projecting from the front wall 14 of the container is carried on the upper end 91 of a lever 92 which extends between the front walls of the housing to a pivot axis 94 in a bracket 96 in the housing. The lever 92 has a lower portion 97 extending beyond the pivot 94 which portion has a slightly curved or shaped rearwardly disposed cam surface 98 which is positioned in the path of movement of a pin 100 radially projecting from the shaft 77 of the timing mechanism 74. A spring 102 is connected to the lower portion 97 of the lever 92 to pull said portion 97 rearward thereby urging the end 91 and the latch member 46 forward into latching position with the catch member 44 on the cover to hold the cover in closed position against the tension of the spring 56 attempting to pull the cover open.

By appropriate indicia on the knob 78, the timing mechanism is set to a predetermined time, the cover 34 is then closed and latched so that the rod 52 will close the microswitch 80 to permit current to flow to start the timing motor 75 of the timing mechanism 74 running. As the time on the mechanism 74 starts to expire the pin 100 on the shaft 77 will be approaching the cam surface 98 on the lever 92 so that upon expiration of the time, the pin will move the lower portion 97 of the lever 92 forward enough to pivot the lever about the pivot 94 thereby moving the upper portion of the lever rearward to retract the latch member 46 from the catch member 44 to release the cover 34 which will pop open under the urging of the spring 56 thereby releasing the rod 82 to open the microswitch 80 cutting off further current to the timing mechanism 74. The time having expired on the timing mechanism 74, the timing mechanism will be deactivated electrically independent of the microswitch 80.

The above detailed description has been pointed primarily to one chamber, one cover 34, one set of actuating mechanism for the cover 34, one timing mechanism 74 and its connection to one cover. It is to be understood that the same mechanism and description is applicable to each chamber whether one, two or more.

Having thus described the structural parts of my invention in detail, I will now describe the method of use of the utensil. After plugging the utensil in, the container is filled with water to a level above the float 70, but below the shelves 60. The chambers 30, 32 are in communication in the container 12 below the partition 28 such that the water in the container is uniformly heated by the heating units 62. With the water at the proper level, the float 70 will raise the rod 68 and close the microswitch 66, such that when the control 64 is turned to any one of the heat settings, the current will flow to and heat the units 62 and the water surrounding them. The water is permitted to heat up for a few minutes before loading the chambers with food. Foods such as eggs in their shells, prepackaged frozen foods such as corn, peas, etc. in their package, or prepackaged meats such as corned beef in their package can be placed on the shelves 60 in the chambers. Specifically, several eggs can be placed on the shelf 60 in chamber 30 and a package of frozen corn can be placed on the shelf 60 in chamber 32. The timers are set and the covers 34 are closed and latched. That is, the timer for chamber 30 and the eggs can be set at 3 minutes and the timer for chamber 32 and the corn can be set at 12 minutes. Closing the covers 34 will close the microswitches 80 and the timing motors 75 will start to run. Steam will quickly fill the appropriate chambers and will cook the eggs and corn in the same fashion as if the foods were in boiling water.

When the 3 minutes are up, cover 34 on chamber 30 will open, releasing the steam and substantially stopping the cooking of the eggs. If there is any doubt as to whether the egg is cooked, just touch the egg and if it is cooked it will be hot. The eggs can be left on the shelf to continue slow cooking or they can be removed and new eggs or other foods can be placed on the shelf. A new time interval is set on the dial, the cover is closed and the new eggs or foods will be cooked. When the 12 minutes are up for the food in chamber 32, the cover will open, the steam will be released and the packaged corn will have been cooked. The packaged corn can be removed and a new food to be cooked can be placed therein and the cycle repeated.

Foods can be placed in containers on the shelves and steamed. That is, for instance, an egg can be opened and placed in a pan which is put on the shelf in a chamber, the timer is set and the cover is closed. The egg will be steamed for the set time interval whereupon the cover will open and the poached egg can be removed. Whether or not the egg is done cooking can be determined by looking at the egg for the characteristic appearance.

In one operating unit, each chamber 30 and 32 has been made of a size to accommodate a dozen eggs in their shells or four pans for poaching four eggs at one time in each chamber.

The foregoing detailed description is given for clearness of understanding only and no unnecessary limitations are to be understood therefrom, as some modifications will be obvious to those skilled in the art.

I claim:

1. A cooking utensil having an open container, a cover for closing the opening in said container, means for urging said cover to the open position, independently controlled means for creating heat in said container, means for holding said cover closed relative to said container, preset electrically driven timing means operatively connected to said last named means to release said last named means upon expiration of a period of time set on said timing means, and switch means operated by said cover for starting said preset electrically driven timing means when said cover is in the closed position.

2. A cooking utensil having an open container, a cover for closing the opening in said container, means for urging said cover to the open position, means for creating heat in said container, means for holding said cover closed relative to said container, timing means operatively connected to said last named means to release said last named means upon expiration of a period of time set on said timing means, switch means operated by said cover for starting said timing means when said cover is in the closed position, said means for operatively connecting said timing means to said last named means comprises a pivoted lever with a latch on one end portion and a cam on the other end portion thereof, said latch engaging with a catch on said cover for holding said cover closed, and a cam actuator on said timing means which engages with said cam on the lever for pivoting the lever to release the latch from the catch whereupon the cover will be urged to the open position.

3. A cooking utensil having an open container, a cover for closing the opening in said container, means for urging said cover to the open position, independently controlled means for creating heat in said container, means for holding said cover closed relative to said container, preset electrically driven timing means operatively connected to said last named means to release said last named means upon expiration of a period of time set on said timing means, switch means operated by said cover for starting said preset electrically driven timing means when said cover is in the closed position, said cover operated switch means comprises a switch normally in the open position, and a rod connected to the switch and having one end lying in the path of movement of a portion of said cover during closing of said cover whereby closing said cover will actuate the switch for starting the preset timing means running.

4. A cooking utensil having an open container, a cover for closing the opening in said container, means for urging said cover to the open position, means for creating heat in said container, means for holding said cover closed relative to said container, timing means operatively connected to said last named means to release said last named means upon expiration of a period of time set on said timing means, switch means operated by said cover for starting said timing means when said cover is in the closed position, said cover operated switch means comprises a switch normally in the open position, and a rod connected to the switch and having one end lying in the path of movement of a portion of said cover during closing of said cover whereby closing said cover will actuate the switch for starting the preset timing means running, said means for creating heat in said container comprises heating coils in said container and water in said container covering said heating coils whereupon heat from the coils will heat the water for cooking in the container.

5. A utensil as claimed in claim 4 wherein float means are provided in said container, switch means are provided for said heating coils, and means interconnecting said float means to said switch means to shut off the heating coils when the water level falls below a predetermined point in the container.

6. A cooking utensil having an open container, a cover for closing the opening in said container, means for urging said cover to the open position, means for creating heat in said container, means for holding said cover closed relative to said container, timing means operatively connected to said last-named means to release said last-named means upon expiration of a period of time set on said timing means, and switch means operated by said cover for starting said timing means when said cover is in the closed position, said means for creating heat comprises heating coils submerged in water in the container for creating steam in said container when the cover is held closed.

7. A utensil as claimed in claim 6 wherein means are provided for disconnecting the heating means upon the water level in the container falling below a predetermined amount.

8. A utensil as claimed in claim 7 wherein said means for disconnecting the heating means comprises a float in said container, a switch in the electrical circuit to said heating means, and means connecting said float to said switch to open said switch when the water level falls below minimum desired.

9. A cooking utensil having a container with an opening therein, means for dividing said container into at least two cooking chambers, cover means for closing the opening in each chamber, means for urging each cover means to an open position, heating means in said container for creating steam in each chamber, means for supporting food in the steam in each chamber, means for holding each cover closed relative to the opening in its chamber, timing means operatively connected to each cover holding means for releasing said cover upon the expiration of a period of time set on said timing means, and means coacting between said cover and said timing means to start said preset time on said timing means running when said cover is in the closed position whereupon food in each chamber will be cooked by the steam in said chamber during the time said cover is closed.

10. A utensil as claimed in claim 9 wherein means are provided for shutting off the heating means upon the presence of insufficient steam creating water in the container.

11. A cooking utensil having a heat insulated container open at the top, at least one cooking chamber in said container, a cover for the chamber hinged to said container for pivoting between opened and closed positions relative to the opening in said chamber, means for urging said cover in the opened position, heating means in said container for heating water standing in said chamber, shelf means in the chamber for supporting comestibles to be cooked above the water level therein, latch means carried by the housing for engagement with catch means on the cover for holding said cover closed relative to said cooking chamber, timing means carried by the housing and operatively connected to said latch means, interconnecting means between said cover and said timing means to start said preset timing means running when said cover is in the closed position, whereby said timing means will release said catch means upon expiration of the preset period of time for opening the cover and substantially stopping the cooking of the comestibles on said shelf means in the chamber.